INVENTOR.
Andrew Hallum
BY Victor J. Evans & Co.
ATTORNEYS

United States Patent Office 2,793,469
Patented May 28, 1957

2,793,469
GROUND WARMING DEVICE
Andrew Hallum, Waterloo, Iowa
Application August 22, 1952, Serial No. 305,881
2 Claims. (Cl. 47—19)

This invention relates to devices for warming ground in the early spring in order to start seed, such as watermelon seed before the ground warms sufficiently by the atmosphere, and in particular a tube extended through a watermelon hill with an oil burner positioned to communicate with an extended end of the tube and with one or more outlet tubes extended upwardly through the ground of the hill.

The purpose of this invention is to provide a ground warming device for starting seeds in which the device is adapted to be inserted in a formed hill and wherein heat from the device is evenly distributed throughout the hill.

This invention is an improvement over the device for starting early watermelons of my co-pending application filed December 5, 1951 with the Serial No. 260,022 in that the housing is eliminated and that the heat distributed through the hill by a tube that is adapted to be forced through a hill or elevated portion of ground.

Various methods have been used for starting seeds when the ground is still cold and with seeds, such as watermelon seeds, growth does not start until the ground is comparatively warm. Furthermore seeds of this type embedded in comparatively cold ground rot and do not germinate. With this thought in mind this invention contemplates a ground warming device in the form of a tube that may be buried in the ground or that may be forced through a hill from one side whereby devices of this type may readily be inserted in each hill of watermelons in a field.

The object of this invention is, therefore, to provide means for forming a ground warming device whereby each device is a separate unit and in which a complete unit is adapted to be installed in a watermelon hill.

Another object of the invention is to provide a ground warming device that is adapted to be inserted in a seed hill after the hill is formed.

A further object of the invention is to provide a ground warming device that is adapted to be extended through a hill, such as a hill of watermelon seeds, in which the device is of a simple and economical construction.

With these and other objects and advantages in view the invention embodies an elongated tube having one or more outlet connections extended upwardly from one side thereof with a closure plug for closing an end extended through a hill and a fuel supply tank having a burner thereon adapted to be positioned below a downwardly extended end of the tube or below the branch connections extended downwardly from the tube.

Other features and advantages of the invention will appear from the following description taken in connection with the drawing, wherein.

Figure 1:
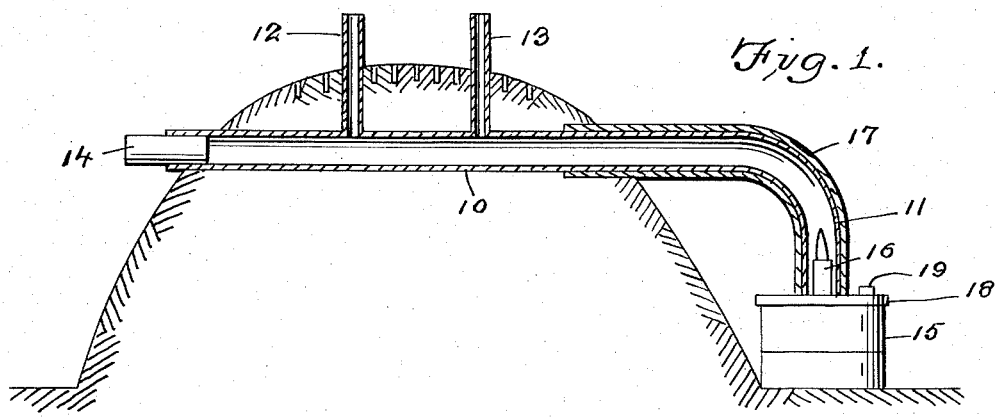
Figure 1 is a longitudinal section through the ground warming device showing a tube extended through a seed hill and in which one end of the tube is extended downwardly to facilitate positioning the tube over a burner.

Referring now to the drawing wherein like reference characters denote corresponding parts the improved ground warming device, particularly as illustrated in Fig. 1 includes a tube 10 having a downwardly extended end 11 with outlet tubes 12 and 13 extended from the upper side and a plug 14 positioned in one end, and a fuel tank 15 having a burner 16 extended upwardly therefrom, the burner being positioned to extend into the downwardly extended end 11 of the tube.

The outer portion of the tube 10 is covered with a sleeve 17 of insulating material to conserve heat from the burner and the tank 15 may be provided with a cover 18 having a filling plug 19 therein.

Figure 2:
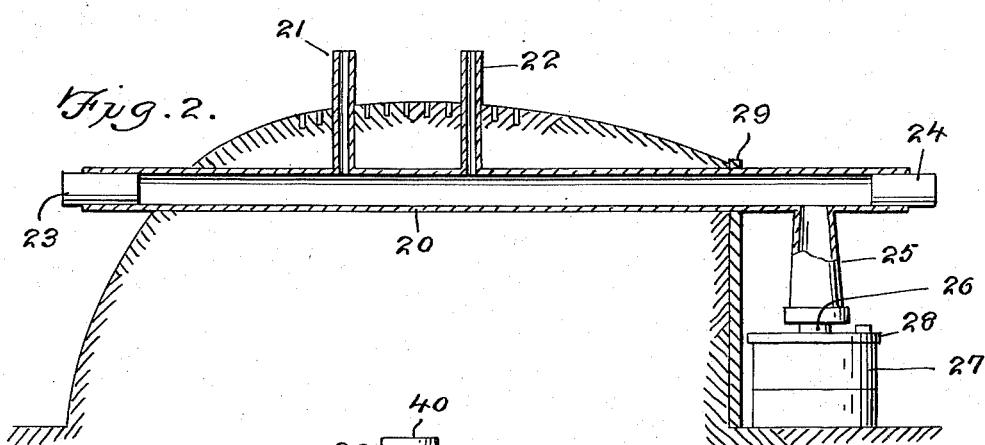
Figure 2 is a similar view illustrating a modification wherein the tube is provided with a side outlet that extends downwardly over a burner.

In the design illustrated in Fig. 2 a tube 20 having tubular outlet connections 21 and 22 extended from the upper side and plugs 23 and 24 in the ends is provided with a frusto-conical shaped side connection 25 that is positioned over a burner 26 on a fuel supply tank 27 whereby heat from the burner passes upwardly through the connection 25 and into the tube 20 which provides the heating chamber for the hill. The tank 27 may be provided with a cover 28, similar to the cover 18 and a plate 29 may be positioned at one side of the tank to prevent soil from the hill covering the tank and burner.

Figure 3:
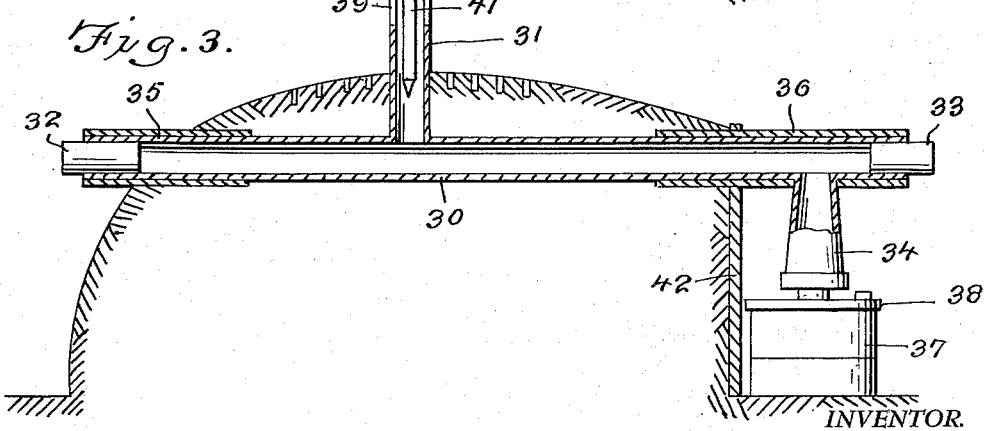
Figure 3 is a view similar to that shown in Figs. 1 and 2 showing a further modification wherein the ends of the tube are covered with insulating material and wherein an outlet connection extended from the tube is provided with a floating closure.

In the design illustrated in Fig. 3, a tube 30, which is provided with an outlet connection 31 and plugs 32 and 33 is provided with a frusto-conical shaped side connection 34 and the exposed ends are covered with sleeves 35 and 36 of insulating material. The connection 34 is positioned over a burner of a tank 37 and the tank is provided with a cover 38 similar to the covers 18 and 28.

In the design illustrated in Fig. 3 the upper end of the outlet connection 31 is provided with slots 39 and a closure cap 40 having a stem 41 is positioned on the upper end of the connection to restrict outward flow of gases from the burner therefrom.

In this design a plate 42 is provided for holding the soil of the hill to prevent the soil running over the burner.

In these designs the plugs restrict outward flow of the hot gases whereby the gases are held in the hill and with the pipes or tubes extended through the hills the heat is evenly distributed throughout the width of the hill.

Furthermore with the devices formed in this manner the seed hills may be preformed or they may be formed after the device is in position.

It will be understood that modifications, within the scope of the appended claims, may be made in the design and arrangement of the parts without departing from the spirit of the invention.

What is claimed is:

1. In combination, a hollow horizontally disposed tube extending through a hill having germinating seeds therein, the ends of said tube extending beyond said hill, a cylindrical plug detachably closing each projecting end of said tube, a vertically disposed hollow pipe extending upwardly from the main portion of said tube and communicating therewith, the upper end of said pipe being provided with slots, a closure plug having a stem positioned on the upper end of said pipe, the upper end of said pipe projecting above the top of said hill, a fuel tank arrange dexteriorly of said hill, a burner extending upwardly from said fuel tank, a frusto-conical shaped connection positioned over said burner and leading to said tube, and sleeves of insulating material positioned over the extending ends of the tube.

2. In combination, a hollow horizontally disposed tube of uniform diameter extending through a hill having germinating seeds therein, the ends of said tube extending beyond said hill, a cylindrical plug detachably closing each projecting end of said tube, said plugs being of the same size, end portions of said plugs extending outwardly beyond the end of said tube, a vertically disposed hollow pipe extending upwardly from the main portion of said tube and communicating therewith, said pipe being arranged at right angles with respect to said tube, the upper end of said pipe being provided with a plurality of slots, a closure plug having a stem positioned on the upper end of said pipe, the upper end of said pipe projecting above the top of said hill, a cylindrical fuel tank arranged exteriorly of said hill, a burner extending upwardly from said fuel tank, a frusto-conical shaped connection having its larger diameter end positioned over said burner and leading to said tube, and sleeves of insulating material positioned over the extending ends of the tube, said sleeves being of greater length than said plugs, and a plate interposed between the burner and the hill for preventing the soil of the hill from contacting the burner.

References Cited in the file of this patent

UNITED STATES PATENTS

| | | | |
|---|---|---|---|
| 59,374 | Everson | Nov. 6, | 1866 |
| 323,151 | Horner | July 28, | 1885 |
| 372,145 | Hartman et al. | Oct. 25, | 1887 |
| 659,279 | Bartholomew | Oct. 9, | 1900 |
| 678,118 | Kruschke | July 9, | 1901 |
| 810,835 | Austin | Jan. 23, | 1906 |
| 1,093,979 | Corliss et al. | Apr. 21, | 1914 |
| 1,160,853 | Cook | Nov. 16, | 1915 |
| 1,964,898 | White et al. | July 3, | 1934 |
| 2,114,942 | Sugg | Apr. 19, | 1938 |
| 2,399,696 | Schreiber | May 7, | 1946 |

FOREIGN PATENTS

| | | |
|---|---|---|
| 3,596 | Great Britain | 1892 |